(12) United States Patent
Williams

(10) Patent No.: X6029
(45) Date of Patent: Jun. 11, 1830

(54) GASOMETER

(76) Inventor: Henry B. Williams

Henry B Williams Baltimore City Maryland

Letters Patent Dated June 11.1830. —

The Schedule referred to in these Letters Patent and making part of the same
containing a description in the words of the said Henry B Williams himself
of his Improvement in Gasometers To all to whom these presents shall come: Be it known that I Henry
B Williams of the City and County of Baltimore and State of Maryland
have invented a new and useful improvement in Gasometers. whereby to regulate
the water line of the said instrument and keep it always at the same height. by which
means the instrument is made to register at all times alike. and the inaccuracy
arising from evaporation or leakage of the water in gasometers on the common construc-
tion is avoided. and that the following is a description of said improvement,
In the annexed drawings Figs 1.&2. are front and side views of a gasometer
without the index and cog wheels or movement. In fig 1. the upper part of
the square side case is removed to show the inside. and Fig 2. is a vertical sec
tion of the side view — D (fig 1.) is the drum which contains the great wheel or
measurer. C the circular communication between the drum and the square side
case A.B. p. the gas admission pipe to the side case which is furnished with
a conical valve and ball. d. W.W.W. is the water line of the instrument
the height of which regulates the quantity of gas passed in one revolution through
the great wheel contained in the drum. of which a vertical transverse section
without the oblique radii or planes is seen in fig 2. t.t. is a rectangular
tube communicating the gas from the space above the water line in the side case
A.B. to the hood or chamber S. of the great wheel. from which the gas thus
conveyed passes into the compartments of the great wheel which lie between the
side plates and the oblique transverse radii. or planes causes the great wheel
to revolve. is discharged into the drum on the opposite side of the wheel and
passes through the pipe y. to the burners. The foot of the tube t t descends
through the bottom of the square side case and has a [illegible] which is govern-
ed by a screw m. for the purpose of draining off any water which may get into it whilst the instrument is adjusting. R is a tube communicating with
with the bottom of the drum D. from the square case Q which encloses a per
fectly air tight reservoir filled with water that communicates by means of
two separate tubes into its bottom with the water in the tube R, r which
will be better understood by reference to figs 3 & 4. where they are shown
on a larger scale. In these figures g. h. represent the two tubes both of
which start from the water line of the instrument (W.W.W.) in the tube
R and one of them g rises above the water line w. w. w. in the reservoir
the effect of which is that if the surface W W W. be lowered by any means
whatever the water from the reservoir will descend through the tube h and
should there be air or gas over the surface of the water in the tube R it
will ascend through the tube g. and these effects will continue till the surface
of the water W W W again comes in contact with the lower ends of the
tubes g h. As the construction and application of this reservoir constitutes
my improvement on gasometers in present use and is what I claim as new
and my invention. It is necessary to describe further the operation of the in
strument. Since what has already been said is sufficient to shew that if
the water line is not kept at the height for which the movement of the index
is calculated, it will not register correctly. since it is easy to perceive
when the water line is too high. the quantity of gas passed by each
revolution of the great wheel will be proportionably less and conversely.
Given under my hand and seal this 12th day of May One thousand
Eight Hundred and thirty Exd. Witnesses..
[illegible] Chas. Keenan
Jno. P. Allbright H. B. Williams

[illegible] (32 [illegible])